(12) United States Patent  
Hauert et al.

(10) Patent No.: US 6,574,073 B1
(45) Date of Patent: Jun. 3, 2003

(54) DISK DRIVE COMPRISING A PLASTIC MOLDED CRASH STOP WITH EMBEDDED MAGNET FOR LATCHING AN ACTUATOR ARM

(75) Inventors: Serge Hauert, San Jose, CA (US); Scott E. Watson, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/355,318

(22) Filed: Jan. 31, 2003

Related U.S. Application Data

(62) Division of application No. 09/728,293, filed on Nov. 30, 2000, now Pat. No. 6,535,358.

(51) Int. Cl.[7] .............................................. G11B 21/22
(52) U.S. Cl. .................. 360/137; 360/256.2; 29/603.03
(58) Field of Search .............................. 360/137, 256.2, 360/256.5; 29/603.03

(56) References Cited

U.S. PATENT DOCUMENTS

| | | | |
|---|---|---|---|
| 5,303,101 A | 4/1994 | Hatch et al. | |
| 5,365,389 A | 11/1994 | Jabbari et al. | |
| 5,369,538 A | 11/1994 | Moe et al. | |
| 5,455,728 A | 10/1995 | Edwards et al. | |
| 5,477,403 A | 12/1995 | Strickler | |
| 5,568,333 A | 10/1996 | Bang | |
| 5,663,855 A | 9/1997 | Kim et al. | |
| 5,703,735 A | 12/1997 | Bleeke | |
| 5,729,405 A | 3/1998 | Isomura et al. | |
| 5,734,527 A | 3/1998 | Reinhart | |
| 5,764,436 A | 6/1998 | Ngo et al. | |
| 5,793,572 A | 8/1998 | Lalouette et al. | |
| 5,815,350 A | 9/1998 | Kennedy et al. | |
| 5,822,155 A | 10/1998 | Oveyssi et al. | |
| 5,905,606 A | 5/1999 | Johnson et al. | |
| 5,982,587 A | 11/1999 | Alagheband et al. | |
| 6,028,744 A | 2/2000 | Amirkiai et al. | |
| 6,137,658 A | 10/2000 | Matsuzaki et al. | |

*Primary Examiner*—Craig A. Renner
(74) *Attorney, Agent, or Firm*—Won Tae C. Kim, Esq.; Milad G. Shara, Esq.; Howard H. Sheerin, Esq.

(57) ABSTRACT

A disk drive is disclosed comprising a base, a disk, an actuator arm comprising a tang attached to a base end of the actuator arm, a head attached to a distal end of the actuator arm, a voice coil motor for rotating the actuator arm about a pivot to position the head radially over the disk, and a crash stop comprising injection molded plastic formed into a body piece having a protruding first arm and a protruding second arm. The body piece of the crash stop is attached to the base of the disk drive. The first protruding arm comprises a magnet at least partially embedded into the plastic for latching the tang of the actuator arm to the first protruding arm. The plastic is formed around the magnet such that at least part of the plastic is between the magnet and the tang. The second protruding arm presents a physical barrier to the tang to limit the stroke of the actuator arm.

3 Claims, 6 Drawing Sheets

DISK DRIVE COMPRISING A PLASTIC MOLDED CRASH STOP WITH EMBEDDED MAGNET FOR LATCHING AN ACTUATOR ARM

CROSS REFERENCE TO RELATED APPLICATIONS AND PATENTS

This application is a division of application Ser. No. 09/728,293, filed Nov. 30, 2000, now U.S. Pat. No. 6,535,358.

This application is related to co-pending patent application Ser. No. 09/584,652 entitled "DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLUX" filed on Jul. 14, 2000, the disclosure of which is incorporated herein by reference.

BACKGROUND OF THE INVENTION

1. Field of the Invention

The present invention relates to disk drives for computer systems. More particularly, the present invention relates to a disk drive comprising a plastic molded crash stop with embedded magnet for latching an actuator arm.

2. Description of the Prior Art

A computer system usually includes one or more disk drives for economical, non-volatile data storage. FIG. 1 shows an exploded view of a disk drive 2 comprising a base 4 for housing a disk 6 and a head 10 attached to a distal end of an actuator arm 8. A spindle motor 12 rotates the disk 6 about its axis, and a voice coil motor (VCM) 14 rotates the actuator arm 8 about a pivot 16 in order to position the head 10 radially over the disk 6. A crash stop 18 is provided which facilitates latching the head 10 in a park position while the disk drive 2 is powered down in order to protect the data recorded on the disk 6 as well as prevent damage to the head 10. In the disk drive of FIG. 1, the head 10 is parked on a landing zone on the inner diameter (ID) of the disk 6. Alternatively, the head 10 may be parked on a ramp located at the periphery of the disk 6 (a.k.a., ramp loading/unloading).

FIG. 2 illustrates the orientation and operation of the crash stop 18 with respect to the actuator arm 8. The actuator arm 8 comprises a tang 20 attached to a base end and positioned between a first arm 22A and second arm 22B of the crash stop 18. The second arm 22B presents a physical barrier to the tang 20 so as to limit the stroke of the actuator arm 8, thereby preventing the head 10 from exceeding a radial limit (e.g., the edge of the disk 6). The first arm 22A comprises a latch with a magnet for latching the tang 20 to the first arm 22A, thereby safely parking the head 10 (e.g., on the inner diameter of the disk 6). In order to prevent damaging the head 10, the force from the magnetic latch should be strong enough to prevent the actuator arm 8 from unlatching even if the disk drive 2 is subjected to an external, physical shock. In addition, it is desirable to achieve a single-point contact between the latch and the tang 20 to attenuate vibrations in the actuator arm 8 which can damage the head 10 due to the head 10 striking the surface of the disk 6 (a.k.a., head-slap).

FIG. 3A illustrates a prior art crash stop 18 and cylindrical latch 24 disclosed in U.S. Pat. No. 5,703,735 which provides a single-point contact with the tang 20. FIG. 3B illustrates a cross-sectional view of the cylindrical latch 24 as comprising a cylindrical magnet 26 having a steel post 28 disposed axially through the magnet 26. The magnet 26 is enclosed in a steel casing 30 which prevents the tang 20 from striking the magnet 26 and releasing contaminates into the disk drive. The post 28 comprises a dome-shaped top surface 28A which provides a single-point contact for the tang 20 which mitigates head-slap.

The strength of the magnetic force generated by the magnet 26 decreases exponentially as the distance between the magnet 26 and the tang 20 increases. The steel post 28 acts as a magnetic flux conductor for conducting the magnetic flux (shown as dashed circles in FIG. 3B) between the north and south poles of the magnet 26 and away from the VCM 14, thereby allowing the use of more powerful magnets without interfering with the operation of the VCM 14. However, because the steel post 28 attracts the magnetic flux away from the tang 20, the magnetic force decreases sharply as the distance between the magnet 26 and tang 20 increases. This is illustrated in FIG. 6 which shows the sharp exponential decrease in the magnetic latching force 32 as the distance between the magnet 26 and the tang 20 increases. Thus, in order to exploit the maximum latching power of the magnet 26 it is important to manufacture the steel post 28 and casing 30 with tight tolerances. If the top surface 28A of the steel post or casing 30 are manufactured too thick, it may result in insufficient latching force leading to drive failure. The multiple part count together with the tight tolerance imposed on the steel post 28 and casing 30, as well as the need to properly align and attach the latch 24 to the crash stop 18, increases the cost and decreases the manufacturing yield of the disk drive. In addition, fretting corrosion may occur due to the tang 20 contacting the steel post 28 which can release contaminates into the disk drive.

U.S. Pat. No. 5,822,155 teaches a latch comprising a magnet contained within a steel cup, wherein the sides of the steel cup conduct the magnetic flux between the north and south pole of the magnet and away from the VCM 14, thereby allowing the use of a more powerful magnet without interfering with the operation of the VCM 14. In one embodiment, a plastic, dome-shaped bumper is attached to the top of the cup and over the magnet which reduces fretting corrosion and facilitates a single-point contact with the tang 20. However, manufacturing a cup by attaching a plastic bumper increases the expense of the latch, and the latch must still be properly aligned and attached to the crash stop 18 which increases the manufacturing cost of the disk drive. Further, if the plastic bumper is manufactured too thick, the latching force may be to small due to the sharp exponential decrease in the latching force inherent with the steel cup design.

U.S. Pat. No. 6,028,744 teaches a latch made in part out of injection molded plastic with an embedded magnet, wherein the thickness of the plastic is more readily controllable so as to attain the desired force/distance distribution with respect to the tang 20. However, the latch disclosed in the '744 patent comprises several parts, including a magnetic plate extension mounted to the base of the disk drive with a "floating" plastic nest having the embedded magnet placed over the magnetic plate. This multiple-part design is more difficult and expensive to manufacture, as well as properly align within the disk drive. Further, the latch disclosed in the '744 patent does not facilitate a single point contact with the tang 20.

Another problem inherent in prior art latch designs is that the maximum latching force may exceed the maximum torque of the VCM 14. Thus, even though the prior art latch designs provide a high latching force at a short distance between the magnet and the tang 20 as illustrated in FIG. 6, thereby providing sufficient latching energy to retain the actuator arm 8 in the latched position in the presence of a physical shock, the maximum latching force may exceed the maximum torque of the VCM 14 preventing the tang 20 from unlatching during spin-up. Thus, the prior art latch designs may prevent the use of a less efficient, but less expensive VCM 14, such as the VCM disclosed in the above-referenced U.S. patent application entitled "DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLU".

There is, therefore, a need for a more cost effective latch for use in a disk drive which mitigates fretting corrosion, provides a single point contact with a tang, has a more gradual force/distance distribution in order to relax the manufacturing tolerances, and exhibits a lower maximum latching force to facilitate the use of less efficient VCMs while providing adequate protection against physical shocks.

SUMMARY OF THE INVENTION

The present invention may be regarded as a disk drive comprising a base, a disk, an actuator arm comprising a tang attached to a base end of the actuator arm, a head attached to a distal end of the actuator arm, a voice coil motor for rotating the actuator arm about a pivot to position the head radially over the disk, and a crash stop comprising injection molded plastic formed into a body piece having a protruding first arm and a protruding second arm. The body piece of the crash stop is attached to the base of the disk drive. The first protruding arm comprises a magnet at least partially embedded into the plastic for latching the tang of the actuator arm to the first protruding arm. The plastic is formed around the magnet such that at least part of the plastic is between the magnet and the tang. The second protruding arm presents a physical barrier to the tang to limit the stroke of the actuator arm.

In one embodiment, the plastic forming at least part of the first arm comprises a curved shaped surface between the magnet and the tang to facilitate a single point contact for the tang. In another embodiment, the plastic forming at least part of the first arm comprises a predetermined thickness to control a force/distance distribution with respect to the magnet and the tang.

The present invention may also be regarded as a method of manufacturing a crash stop for use in a disk drive comprising a disk, a base, an actuator arm comprising a tang attached to a base end of the actuator arm, a head attached to a distal end of the actuator arm, and a voice coil motor for rotating the actuator arm about a pivot to position the head radially over the disk. The method comprises the step of injection molding plastic to form a body piece having a protruding first arm and a protruding second arm. The protruding first arm for latching the tang to the protruding first arm, and the protruding second arm for presenting a physical barrier to the tang to limit the stroke of the actuator arm. The method further comprises the step of embedding a magnet at least partially into the first arm such that at least part of the plastic is between the magnet and the tang.

DESCRIPTION OF THE PREFERRED EMBODIMENTS

Figure 1:
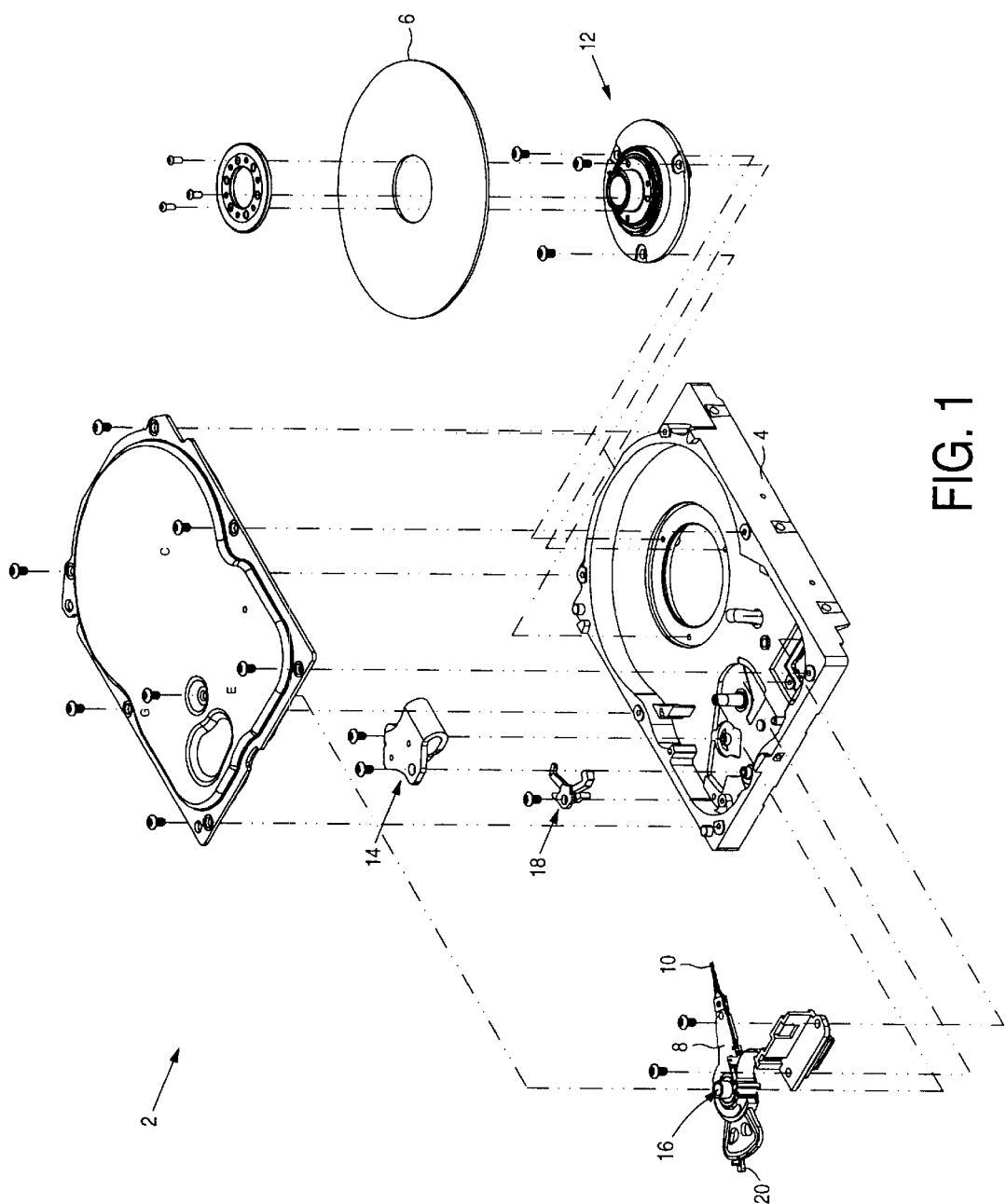
FIG. 1 is an exploded view of a disk drive comprising a head attached to a distal end of an actuator arm, and a crash stop for latching the actuator arm as well as limit the stroke of the actuator arm to limit the radial movement of the head.
Figure 2:
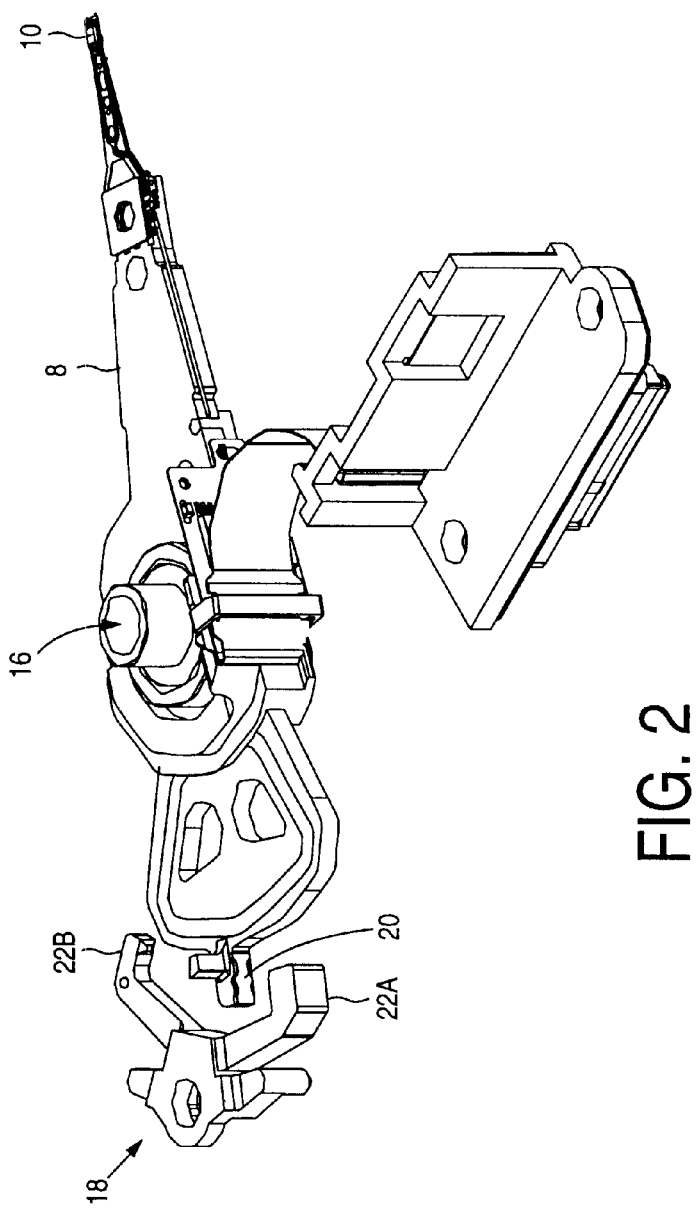
FIG. 2 shows the orientation and operation of the crash stop with respect to a tang attached to the actuator arm.
Figure 4A:
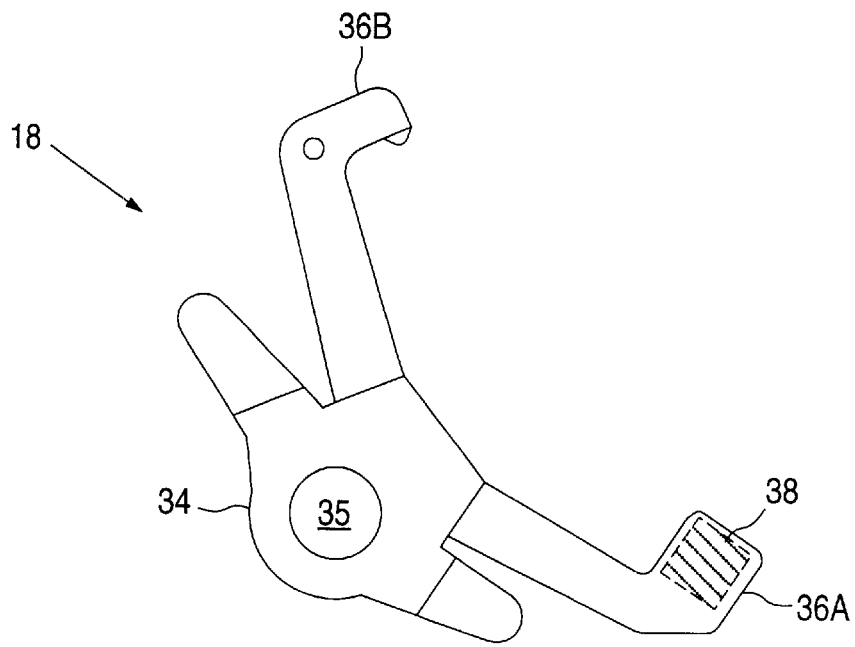
FIG. 4A is a top view of a crash stop according to an embodiment of the present invention comprised of injected molded plastic formed into a body piece having a protruding first arm and a protruding second arm, wherein the first protruding arm comprises a magnet at least partially embedded into the plastic for latching the tang of the actuator arm to the first protruding arm.
Figure 4B:
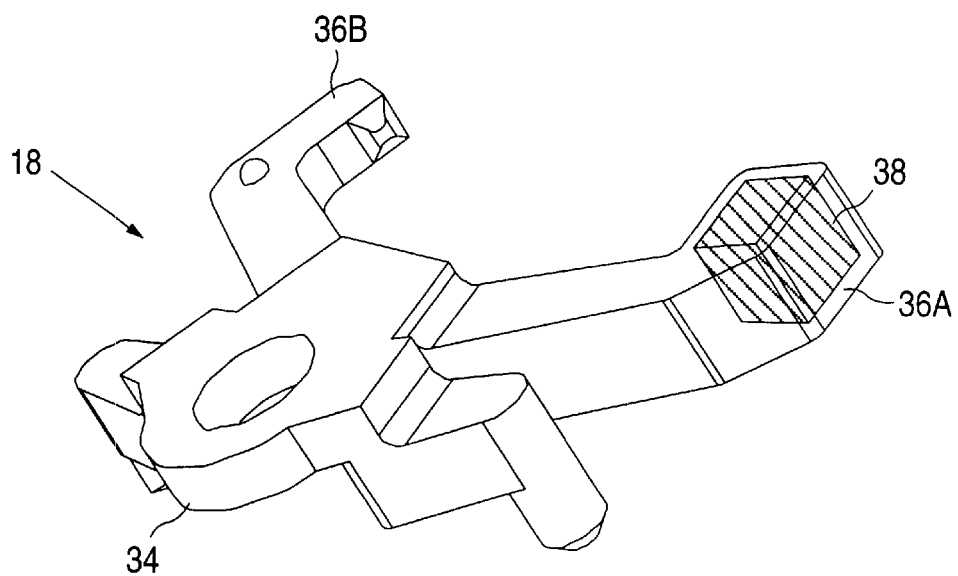
FIG. 4B shows a perspective view of the crash stop of FIG. 4A.

FIG. 1 shows a disk drive 2 according to an embodiment of the present invention comprising a base 4, a disk 6, an actuator arm 8 comprising a tang 20 attached to a base end of the actuator arm 8, a head 10 attached to a distal end of the actuator arm 8, a voice coil motor 14 for rotating the actuator arm about a pivot 16 to position the head 10 radially over the disk 6, and a crash stop 18. As illustrated in FIGS. 4A and 4B, the crash stop 18 comprises injection molded plastic formed into a body piece 34 having a protruding first arm 36A and a protruding second arm 36B. The body piece 34 of the crash stop is attached to the base 4 of the disk drive 2. The first protruding arm 36A comprises a magnet 38 at least partially embedded into the plastic for latching the tang 20 of the actuator arm 8 to the first protruding arm 36A. The plastic is formed around the magnet 38 such that at least part of the plastic is between the magnet 38 and the tang 20. The second protruding arm 36B presents a physical barrier to the tang 20 to limit the stroke of the actuator arm 8 (e.g., to prevent the head 10 from falling off the edge of the disk 6).

Figure 5A:
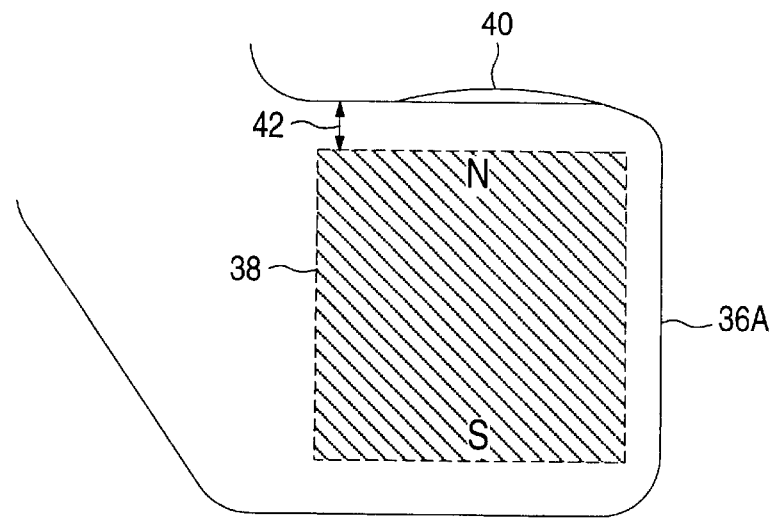
FIG. 5A shows a cross sectional view of the first protruding arm of the crash stop of FIG. 4A, including a curved surface for providing a single point contact for the tang.

In one embodiment shown in FIG. 5A, the plastic forming at least part of the first protruding arm 36A comprises a curved-shaped surface 40 between the magnet 38 and the tang 20 to facilitate a single point contact for the tang 20. The single point contact mitigates vibrations in the actuator arm 8 that can damage the head 10 due to the head 10 contacting the surface of the disk 6 (head-slap). In addition, fretting corrosion inherent with the prior art steel post or steel cup designs is avoided since the tang 20 contact involves the injection molded plastic.

Injection molding the plastic crash stop 18 and embedding the magnet 38 into the plastic also reduces the manufacturing cost of the disk drive 2. The crash top 18 comprises a unitary piece that can be attached to the base 4 of the disk drive 2 using any suitable means, such as a screw inserted through an aperture 35 of the body 34. In addition, the tolerances of injection molded plastic are more readily controllable, particularly the thickness 42 of the plastic between the magnet 38 and the tang 20. Consequently, injection molding the crash stop 18 provides tighter tolerance over the latching force of the magnet 38, thereby improving reliability and reducing the manufacturing cost of the disk drive 2 by relaxing the manufacturing tolerances of other components. In addition, the plastic can be more readily formed into a curve-shape surface 40 to facilitate the single point contact aspect described above.

Figure 5B:
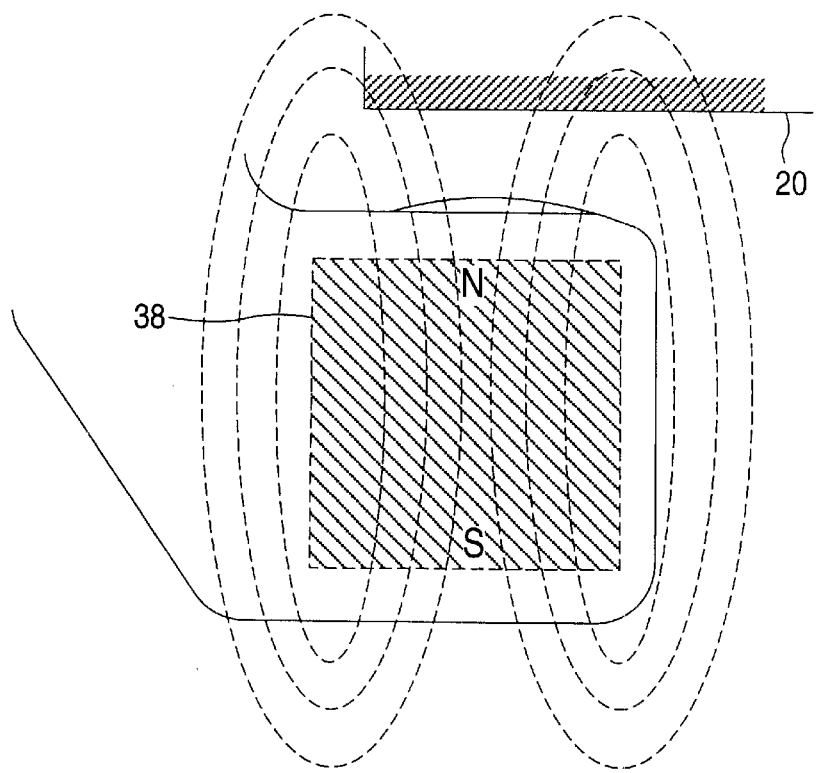
FIG. 5B illustrates the magnetic flux lines generated by the magnet embedded in the first protruding arm of the crash stop of FIG. 4A, wherein the resulting latching force/distance distribution has a more gradual exponential decay.
Figure 6:
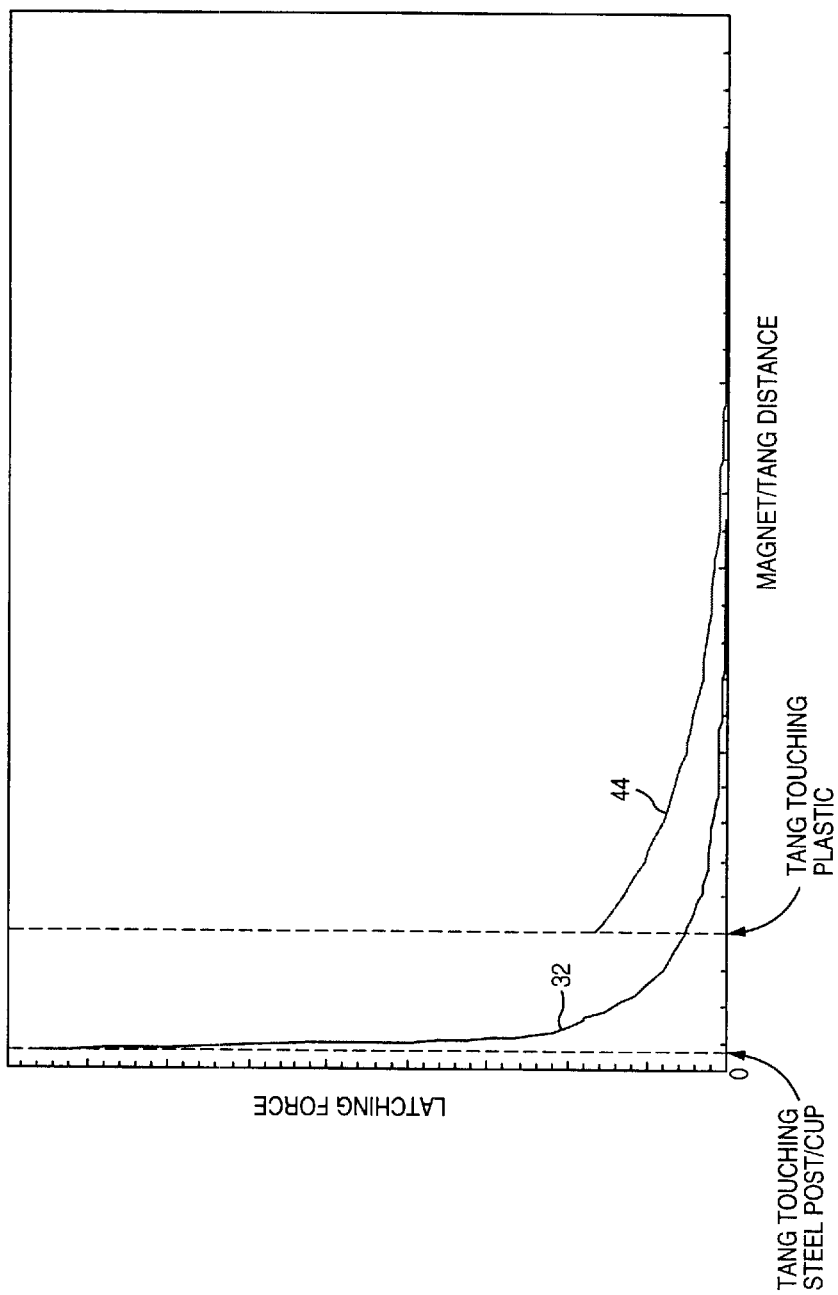
FIG. 6 shows the latching force/distance distribution for the prior art cylindrical latch of FIG. 3A compared to the latching force/distance distribution for the injection molded plastic latch of FIG. 4A.

Injection molding the crash stop 18 and embedding the magnet 38 in the plastic also provides a more gradual exponential decrease in the latching force/distance distribution. As shown in FIG. 5B, the plastic exhibits a high reluctance such that the magnetic flux (shown as dashed circles) extends further out from the magnet 38 as compared to the prior art latch 24 of FIG. 3B. As shown in FIG. 6, the slope of the magnetic latching force 44 is thus more gradual with respect to the increasing distance between the magnet 38 and the tang 20.

Figure 3A:
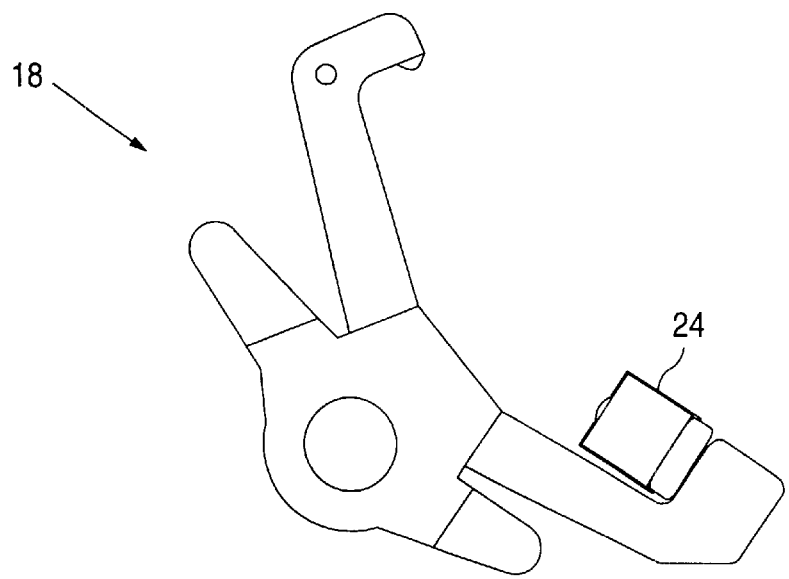
FIG. 3A shows a prior art crash stop comprising a cylindrical latch which is attached to the crash stop.
Figure 3B:
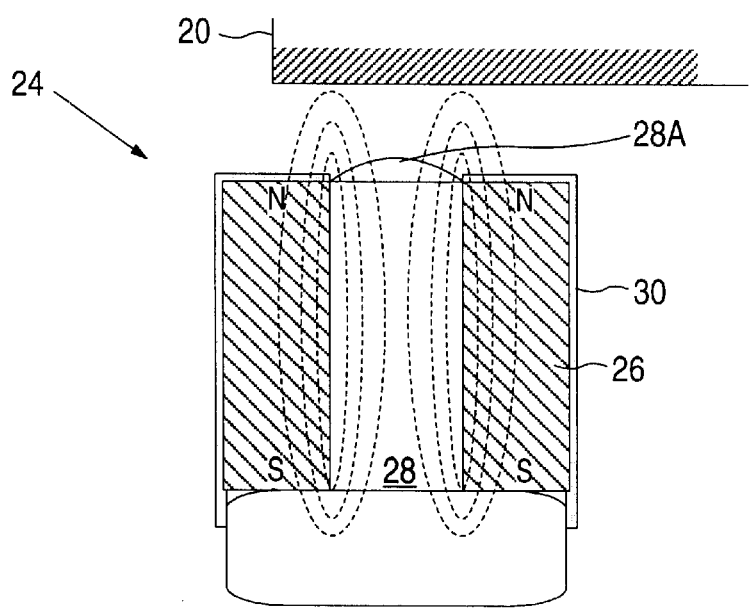
FIG. 3B is a cross-sectional view of the prior art cylindrical latch shown in FIG. 3A.

FIG. 6 also illustrates that the maximum latching force 44 of the magnet 38 (when the tang 20 is touching the plastic) is reduced significantly as compared to the latching force 32 generated by the prior art latch 24 of FIG. 3B when the tang 20 is touching the steel post or steel cup. This is because the latch of FIG. 5A is designed such that the distance 42 between the tang 20 and the magnet 38 is significantly greater than the prior art steel post or steel cup designs. Even though this reduces the maximum latching force 44, the latch of FIG. 5B still provides sufficient latching energy to maintain the actuator arm 8 in the latched position in the presence of physical shocks. This is because the latching energy is determined from the integral of the latching force, and the integral increases as the exponential decay of the latching force decreases due to the high reluctance of the plastic.

In addition, the lower maximum latching force 44 generated by the latch of FIG. 5B facilitates the use of less efficient, and less expensive, VCMs which generate less torque. For example, one embodiment of the present invention employs a C-shaped VCM disclosed in the above referenced U.S. patent application entitled "DISK DRIVE EMPLOYING A VOICE COIL MOTOR COMPRISING A YOKE FOR GENERATING A UNIDIRECTIONAL MAGNETIC FLUX AND A VOICE COIL PARTIALLY INTERACTING WITH THE UNIDIRECTIONAL MAGNETIC FLUX". Although the C-shaped VCM generates less torque than prior art designs, it reduces the manufacturing cost of the disk drive due to a single piece yoke, single piece magnet, and simplified assembly within the disk drive. Since the maximum latching force 44 generated by the latch of FIG. 5B is significantly less than the prior art latch designs, the C-shaped VCM is able to unlatch the actuator arm 8 during spin up.

In one embodiment, manufacturing the crash stop 18 of FIG. 4B comprises the steps of forming a cavity within the first protruding arm 36A, inserting the magnet 38 into the cavity, and injection molding plastic over the cavity to seal the magnet 38 within the first protruding arm 36A. Other methods of manufacture may also be employed, such as injection molding the plastic around the magnet 38. In yet another embodiment, the magnet 38 is only partially embedded within the first protruding arm 36A rather than sealed completely within the first protruding arm 36A. In still another embodiment, at least part of the magnet is exposed, for example, through an aperture in the plastic. The magnet 38 shown in the embodiment of FIG. 4B is cube-shaped, but any suitable shape, such as a ball, rectangular or cylindrical shape, may be employed.

We claim:

1. A method of manufacturing a crash stop for use in a disk drive comprising a disk, a base, an actuator arm comprising a tang attached to a base end of the actuator arm, a head attached to a distal end of the actuator arm, and a voice coil motor for rotating the actuator arm about a pivot to position the head radially over the disk, the method comprising the steps of:

(a) injection molding plastic to form a body piece having a protruding first arm and a protruding second arm, wherein: the protruding first arm is for latching the tang to the protruding first arm; and the protruding second arm presents a physical barrier to the tang to limit the stroke of the actuator arm;

(b) embedding a magnet at least partially into the first arm such that at least part of the plastic is between the magnet and the tang.

2. The method of manufacturing as recited in claim 1, wherein the step of injection molding the plastic to form the first protruding arm comprises the step of forming a curved shaped surface between the magnet and the tang to facilitate a single point contact for the tang.

3. The method of manufacturing as recited in claim 1, further comprising the step of selecting a thickness for the plastic between the magnet and the tang to control a force/distance distribution with respect to the magnet and the tang.

* * * * *